J. W. CONDON.

Egg and Cake Beater.

No. 9,615. Reissued March 22, 1881.

Witnesses.
Harry Smith
James F. Tobin.

Inventor.
John W. Condon
by his attorneys
Howson and Sons

N. PETERS PHOTO-LITHOGRAPHER, WASHINGTON, D. C.

UNITED STATES PATENT OFFICE.

JOHN W. CONDON, OF LOGANSPORT, INDIANA.

EGG AND CAKE BEATER.

SPECIFICATION forming part of Reissued Letters Patent No. 9,615, dated March 22, 1881.

Original No. 140,891, dated July 15, 1873. Application for reissue filed February 15, 1881.

*To all whom it may concern:*

Be it known that I, JOHN W. CONDON, of Logansport, in the county of Cass and State of Indiana, have invented a new and useful Improvement in Egg and Cake Beaters; and I do hereby declare the following to be a full, clear, and exact description of the same.

My invention consists of a combination, described hereinafter, of a fixed vessel for containing the substance to be mixed, paddles or beaters and scrapers, and gearing for causing the same to revolve in contrary directions.

Figure 1:
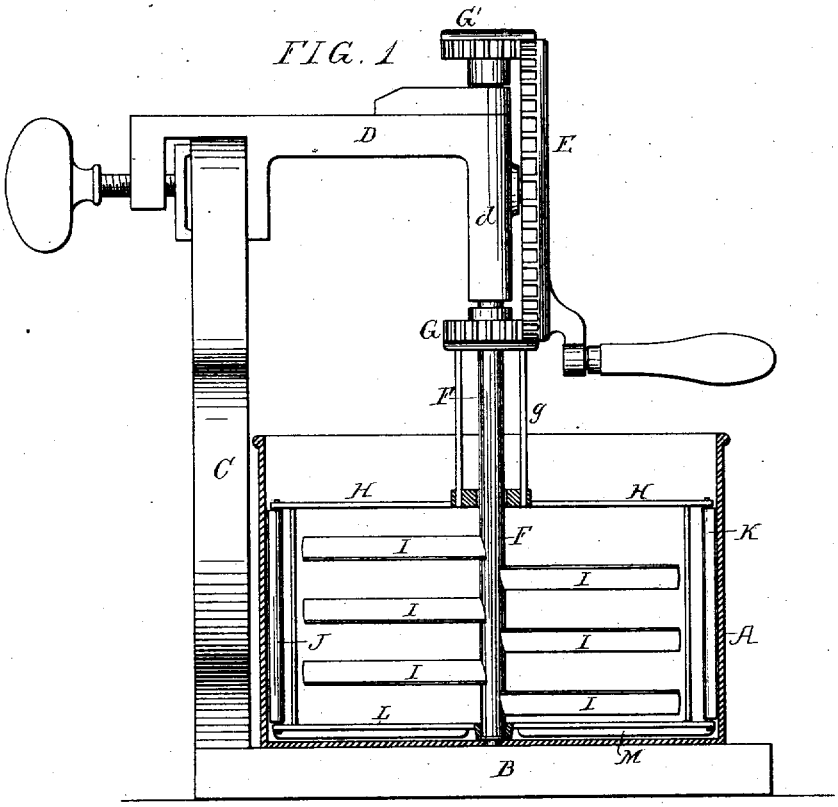
Figure 2:
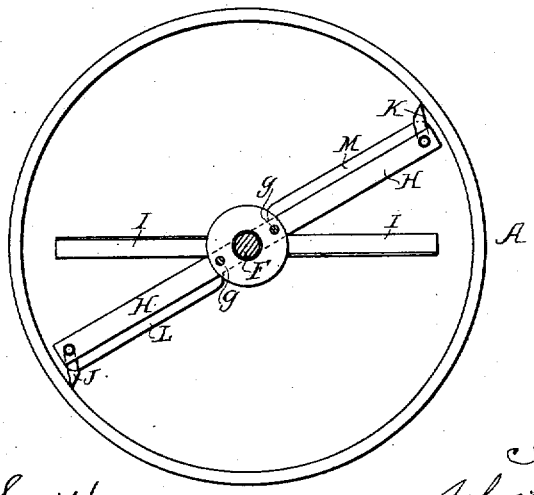

In the accompanying drawings, Figure 1 is a side elevation, partly in section, of an egg and cake mixer with my improvements; and Fig. 2, a plan view of the mixer.

A is the vessel in which the mixing is effected; B, the platform on which the vessel is placed; C, an upright or frame attached to the base; D, an arm clamped thereto, and E a cog-wheel arranged to turn on a pin projecting from the arm D.

F is a vertical shaft arranged to turn in the projection *d* of the arm D, and at its lower end in the bottom of the vessel A. A pinion, G′, secured to the upper end of the shaft, gears into the wheel E, and another pinion, G, loose on the shaft, gears into the same wheel, the latter pinion being connected by rods *g* to a frame, H, so that on turning the wheel E the shaft F will revolve in one direction and the frame H in the opposite direction.

From opposite sides of the shaft F project radial paddles or beaters I, preferably placed obliquely to a horizontal plane.

On the lower portion of the frame are scrapers L M, for acting on the bottom of the vessel, and on the sides of the frame are scrapers J K, for acting on the sides of the vessel, these scrapers being preferably made of wood.

The operation is as follows: The paddles rotate and beat up the adhesive liquid in one direction, while the scrapers rotating in the opposite direction scrape off any material which may lodge on the bottom or against the sides of the vessel and direct it into the path of the beaters, the vessel meanwhile remaining undisturbed, as the tendency of the beaters to turn it in one direction is neutralized by the tendency of the scrapers to turn it in the opposite direction.

I claim as my invention—

The combination, in an egg and cake beater, of the following elements, namely: first, a fixed vessel, A, containing the material to be mixed; second, revolving scrapers adapted to the vessel; third, paddles or beaters; and, fourth, gearing whereby the scrapers and beaters are caused to revolve in contrary directions.

In testimony whereof I have signed my name to this specification in the presence of two subscribing witnesses.

J. W. CONDON.

Witnesses:

DAN. B. ANDERSON,

SARAH JANE ANDERSON.